United States Patent
Janssen

(10) Patent No.: US 10,610,977 B2
(45) Date of Patent: *Apr. 7, 2020

(54) ALUMINIUM COMPOSITE MATERIAL HAVING AN INTERNAL SOLDER LAYER

(71) Applicant: Hydro Aluminium Rolled Products GmbH, Grevenbroich (DE)

(72) Inventor: Hartmut Janssen, Hilden (DE)

(73) Assignee: Hydro Aluminium Rolled Products GmbH, Grevenbroich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/612,565

(22) Filed: Jun. 2, 2017

(65) Prior Publication Data

US 2017/0266766 A1 Sep. 21, 2017

Related U.S. Application Data

(63) Continuation of application No. 14/976,538, filed on Dec. 21, 2015, now Pat. No. 9,718,149, which is a (Continued)

(30) Foreign Application Priority Data

Jul. 5, 2013 (EP) .................................... 13175413

(51) Int. Cl.
  *B32B 15/01* (2006.01)
  *B23K 35/28* (2006.01)
  (Continued)

(52) U.S. Cl.
  CPC .......... *B23K 35/286* (2013.01); *B23K 1/0012* (2013.01); *B23K 35/002* (2013.01);
  (Continued)

(58) Field of Classification Search
  None
  See application file for complete search history.

(56) References Cited

U.S. PATENT DOCUMENTS 2,821,014 A   1/1958 Miller
3,167,405 A   1/1965 Muije et al.
(Continued)

FOREIGN PATENT DOCUMENTS

CN   101372159 A   2/2009
EP   0 712 681 A2   5/1996
(Continued)

OTHER PUBLICATIONS

The Aluminum Association, "International Alloy Designations and Chemical Composition Limits for Wrought Aluminum and Wrought Aluminum Alloys", Registration Record Series Teal Sheets, revised Feb. 2009, 35 pages.
(Continued)

*Primary Examiner* — Daniel J. Schleis
(74) *Attorney, Agent, or Firm* — Reinhart Boerner Van Deuren P.C.

(57) ABSTRACT

The invention relates to a brazable three-layered aluminium composite material having at least three layers with at least two different aluminium alloys, whereby an inner layer of the at least three layers is an aluminium brazing layer made from an aluminium brazing alloy, the other layers are configured as covering layers and include at least one further aluminium alloy, wherein the at least one further aluminium alloy has a higher solidus temperature than the liquidus temperature of the aluminium brazing alloy. The individual covering layers have a thickness which exceeds the thickness of the aluminium brazing layer by at least a factor of 1.5, preferably by a factor of 5. The brazable aluminium composite material is simply structured, has good brazing properties for the production of butt-joint brazing connections, significantly reduces the risk of a 'burning through' of brazed-on components and provides sufficient mechanical properties.

15 Claims, 2 Drawing Sheets

Related U.S. Application Data continuation of application No. PCT/EP2014/064315, filed on Jul. 4, 2014.

(51) Int. Cl.

| | | |
|---|---|---|
| B23K 1/00 | (2006.01) | |
| B23K 35/00 | (2006.01) | |
| B23K 35/02 | (2006.01) | |
| F28F 21/08 | (2006.01) | |
| F28F 9/02 | (2006.01) | |
| F28D 1/03 | (2006.01) | |
| F28D 1/053 | (2006.01) | |
| C22C 21/00 | (2006.01) | |
| C22C 21/02 | (2006.01) | |
| F28F 1/00 | (2006.01) | |

(52) U.S. Cl.
CPC ...... *B23K 35/0222* (2013.01); *B23K 35/0238* (2013.01); *B32B 15/016* (2013.01); *C22C 21/00* (2013.01); *C22C 21/02* (2013.01); *F28D 1/0391* (2013.01); *F28D 1/05366* (2013.01); *F28F 1/00* (2013.01); *F28F 9/02* (2013.01); *F28F 21/084* (2013.01); *F28F 21/089* (2013.01); *Y10T 428/12764* (2015.01)

(56) References Cited

U.S. PATENT DOCUMENTS

| | | |
|---|---|---|
| 4,161,553 A | 7/1979 | Vernann et al. |
| 4,825,941 A | 5/1989 | Hoshino et al. |
| 6,635,360 B2 | 10/2003 | Takeno et al. |
| 8,158,273 B2 | 4/2012 | Wittebrood |
| 2011/0100615 A1 | 5/2011 | Henry et al. |

FOREIGN PATENT DOCUMENTS

| | | |
|---|---|---|
| EP | 1 457 616 A1 | 9/2004 |
| EP | 2 193 873 A2 | 6/2010 |
| JP | 06-047578 A | 2/1994 |
| JP | 11-315337 A | 11/1999 |
| JP | 2002-018570 A | 1/2002 |
| JP | 2005-037062 A | 2/2005 |
| JP | 2005-510688 A | 4/2005 |
| KR | 10-2005-0025992 A | 3/2005 |
| WO | WO 2004/011188 A1 | 2/2004 |

OTHER PUBLICATIONS

J. R. Davis, "Brazing and Soldering", ASM Specialty Handbook Aluminum and Aluminum Alloys, ASM International, Dec. 1993, pp. 420-423, 6 pages.

John E. Hatch, "Aluminum: Properties and Physical Metallurgy", American Society for Metals, Jan. 1993, pp. 301, 372-373, 4 pages.

ALUMINIUM COMPOSITE MATERIAL HAVING AN INTERNAL SOLDER LAYER

CROSS-REFERENCE TO RELATED PATENT APPLICATIONS

This patent application is a continuation of U.S. patent application Ser. No. 14/976,528, filed Dec. 21, 2015, which is continuation of PCT/EP2014/064315, filed Jul. 4, 2014, which claims priority to European Application No. 13 175 413.7, filed Jul. , 2013, the entire teachings and disclosure of which are incorporated herein by reference thereto.

FIELD OF THE INVENTION

The invention relates generally to aluminium composite materials and more particularly to brazable aluminium composite materials.

BACKGROUND OF THE INVENTION

Brazable aluminium composite materials have long been known from the prior art. The aluminium composites materials used for brazed connection technology usually have an aluminium brazing layer on the surface which melts during the brazing process so that the component that has the aluminium brazing layer is connected to the connection partner by means of a brazed connection. The other layers of the aluminium composite material are not melted. A corresponding connecting process occurs for example during the manufacture of heat exchangers, which usually have a number of brazed connection joints, for example for attaching the lamellae or the tubes carrying liquid. Until now, sheets of metal equipped with external aluminium brazing layers were used for brazing heat exchangers. However, particularly on the brazed connections provided for an I-shaped butt joint, problems occur owing to an excess of aluminium brazing material. As a result of a local surplus of silicon, the liquidus temperature of the connection partner is severely reduced locally, so that a 'burning through' or a reduction in the wall thickness of the component may occur in this area. The risk of a surplus of silicon is present for example on the I-shaped butt-joint brazed connections of the main distributor and the associated water-carrying tubes. Even if no 'burning through' of the tube to be brazed takes place during the brazing process, areas of reduced wall thickness may be generated or what is known as a 'liquid film migration' effect may occur. With a liquid film migration effect, for example, microstructural defects appear on certain areas of the surface which can be attributed to the diffusion of silicon in the composite material. These areas of the brazed components constitute a problem in relation to the longevity of, for example, a brazed heat exchanger. The normally used external aluminium layers of the composite materials used are aluminium brazing layers, which soften during the brazing process and subsequently solidify again. As a result of this, owing to the flow behaviour of the aluminium brazing layer, mechanical problems may additionally arise concerning a notch effect of the solidified, irregular aluminium brazing layer surface on other components of the heat exchanger. In addition, subsequent coating of the heat exchangers may be problematic owing to the melted and re-solidified outer layer. Also disadvantageous is the fact that the external aluminium brazing layers are covered with an aluminium oxide layer which, during the creation of the brazed connections, can cause problems in relation to the brazed connections' wettability with aluminium brazing material. As a result of this, increased use of fluxes becomes necessary in order to guarantee the quality of the brazed connections. From published US patent application US 2003/0099856 A1, for example, a brazable aluminium composite material is known that consists of a total of five layers, whereby an internal aluminium core alloy layer is provided which is surrounded by two outer aluminium brazing layers on which, additionally, a thin aluminium layer is applied. The thin aluminium layer is designed to ensure that the aluminium solder does not oxidise, so that the use of fluxes can be dispensed with. However, the layer structure of the known aluminium composite material is relatively complex, since at least five aluminium alloy layers have to be provided in total. The outer, very thin covering layer, however, melts during the brazing process, which means that the problems described above concerning the melted surface are not solved. In particular, the provision of very thin covering layers on the aluminium brazing layer places high demands on the production process, so that one must expect high manufacturing costs. From U.S. Pat. No. 4,825,941, the manufacture of a heat exchanger is known which has a main distributor that is brazed to the flat tubes carrying liquid by means of I-shaped butt-joint brazed connections.

Starting from this prior art, it is the objective of the present invention to provide a brazable aluminium composite material which has a simple structure, has good brazing properties for the production of I-shaped butt-joint brazed connections, significantly reduces the risk of 'burning through' of brazed-on components and provides adequate mechanical properties. Over and above this, a brazed construction should be proposed.

BRIEF SUMMARY OF THE INVENTION

The invention provides a three-layered brazable aluminium composite material consisting of at least two different aluminium alloys, whereby one inner layer of the three layers is an aluminium brazing layer made from an aluminium brazing alloy, the other layers are configured as covering layers and consist of at least one further aluminium alloy, whereby the at least one further aluminium alloy has a higher solidus temperature than the liquidus temperature of the aluminium brazing alloy. In addition, the invention relates to a brazed construction.

Alternatively, the invention also provides an aluminium composite material comprising a three-layered aluminium composite material with an inner aluminium brazing layer made from an aluminium brazing alloy and two covering layers made from at least one further aluminium alloy, whereby the at least one further aluminium alloy has a higher solidus temperature than the liquidus temperature of the aluminium brazing alloy, which additionally has an anti-corrosion coating or anti-corrosion coatings arranged on the covering layers and/or aluminium brazing alloy layers provided on one or both sides of the covering layers.

In accordance with a first teaching of the present invention, the indicated objective is solved by an aluminium composite material in that the individual covering layers having a thickness which exceeds the thickness of the aluminium brazing layer by at least a factor of 1.5, preferably at least by a factor of 5.

It has become apparent that a simple, three-layered aluminium composite material which has an internal aluminium brazing layer and two covering layers, whereby the covering layers have a thickness that is thicker than the aluminium brazing layer by a factor of 1.5 or more, not only permits flawless brazing results but also considerably reduces the risk of 'burning through'. In addition, this brazable aluminium composite material provides, as an outer surface, a rolled aluminium surface, which, after brazing, does not exhibit any problems in relation to imperfections in the surface and the resulting notch effects with other components. If the factor is 5 or more, the strength of the aluminium composite material is determined even more strongly by the covering layers. It is conceivable that the aluminium composite material in accordance with the present invention has only a three-layered structure. Depending on the application, it may however also be supplemented by further outer layers in order to guarantee specific requirements relating to the aluminium composite material, the provision of a sacrificial anode layer or further brazing layers. The covering layers of the aluminium composite material make a significant contribution to the mechanical properties of the aluminium composite material, which are not affected by the melting of the brazing layer in the interior of the aluminium composite material. Naturally it is conceivable that the covering layers consist of different aluminium alloys.

As an alternative to the purely three-layered aluminium composite material, therefore, the objective is also solved by an aluminium composite material which first of all has a corresponding three-layered structure with an inner brazing layer, the individual cover layers have a thickness which exceeds the thickness of the aluminium brazing layer by at least a factor of 1.5, preferably by at least a factor of five, and further outer layers are provided which are designed as sacrificial anode layer, anti-corrosion layer or outer brazing layers.

Preferably the covering layers have a thickness of 10% to 49%, preferably 15% to 47.5% of the total thickness of the aluminium composite material. As a result, it is ensured that, as already explained, the effect of the covering layers on the mechanical properties of the aluminium composite material is particularly high and a high dimensional stability can also be guaranteed during the brazing process.

Preferably the thickness of the aluminium brazing layer is at least 25 μm, preferably at least 50 μm, so that the process reliability for provision of a flawless brazed connection, for example in an I-shaped butt joint, is improved.

Depending on the particular applications, the individual covering layer may consist of an aluminium alloy of type AA1xxx, AA3xxx, AA5xxx, AA6xxx or AA7xxx, whereby, optionally, the covering layers are constructed either from identical aluminium alloys or from different aluminium alloys. In addition, the thicknesses of the covering layers do not have to be identical, but can be specifically selected depending on the case of application. It is conceivable, for example, that the covering layers consist of aluminium alloys of type AA3003 or AA3005.

Usually, aluminium alloys of type AA4xxx are selected for the aluminium brazing layer, whereby preferably the aluminium brazing layer consists of an AlSi aluminium alloy with a Si content of 6% w/w-13% w/w. These aluminium brazing alloys are used for the provision of aluminium brazing cladding, as these have a liquidus temperature which lies significantly below the solidus temperatures of the aluminium alloys used for the covering layers.

In accordance with a further embodiment, preferably the total thickness of the aluminium composite material is 0.2 mm to 1.5 mm or more than 1.5 mm to 5 mm. Aluminium composite materials with 0.2 mm to 1.5 mm then, although having good brazability, do not contribute massively to the overall strength of a brazed construction, whereas aluminium composite materials with a total thickness of more than 1.5 mm to 5 mm may, for example, form constructions that can accommodate a load. A preferred thickness range of the aluminium composite material lies between 0.3 mm to 1.0 mm. This constitutes the preferred thickness range for parts of heat exchangers with a small wall thickness.

In accordance with a further embodiment of the aluminium composite material, the aluminium composite material is produced by means of roll cladding or simultaneous casting. With roll cladding, cladding materials and the covering layers are stacked to a rolling ingot and subsequently hot rolled, wherein a flat, firmly bonded connection is produced between the individual aluminium alloy layers. Another method for the production of an aluminium composite material is the simultaneous casting of the individual aluminium composite material layers. Unlike roll cladding, here molten masses of different aluminium alloys are simultaneously cast into a strip. The aluminium composite materials produced with roll cladding differ from the aluminium composite materials produced by means of simultaneous casting in that there is a discrete layer transition between the covering layers, for example, and the aluminium brazing layer. With simultaneous casting, on the other hand, owing to the high temperatures, a significant concentration gradient between the individual participating layers is unavoidable.

In accordance with a further embodiment of the aluminium composite material according to the invention, the covering layers consist of aluminium alloys that have a Mg content of less than 0.25 wt.-%, preferably less than 0.1 wt.-%. The reduction of the Mg content in the covering layers of the aluminium alloys contributes to the fact that during brazing with the use of fluxes, the brazing process is not disrupted by the alloy components of the covering layers. In particular, suitability for the less complex CAB brazing techniques is then improved.

In accordance with a further teaching of the present invention, the objective indicated above is solved by a brazed construction comprising at least a first component, which consists at least in part of an aluminium composite material according to the invention, whereby the first component is connected to at least a second component by means of a brazed connection. As already previously explained, the aluminium composite material is very suitable for the provision of brazed connections because, by means of the covering layers, the aluminium brazing layer cannot oxidise again during the brazing process. In addition to this, the covering layers contribute to the mechanical strength of the first component and simultaneously prevent a 'burning through' of the second component during brazing owing to a surplus of aluminium brazing material.

Preferably the construction has at least one brazed connection in the form of an I-shaped butt joint, since here the aluminium composite material according to the invention, with brazed connections in the form of I-shaped butt joints, achieves particularly good brazing results owing to the internal aluminium brazing layer.

In accordance with a further embodiment of the brazed construction, the latter is a heat exchanger or a part of a heat exchanger. For example, preferably the main distributor of a heat exchanger, consists, which is designed to accommodate flat tubes or tubes conveying cooling liquid, with which this is connected by means of a I-shaped butt joint. A further preferred embodiment is folded tubes which consist of an aluminium alloy sheet, which is for example bent into a B-shaped cross section and brazed. A folded tube therefore likewise always has at least one I-shaped butt-joint brazed connection.

BRIEF DESCRIPTION OF THE DRAWINGS

Below, the invention shall be explained in more detail by means of embodiments in combination with the drawing. The drawing shows the following.

DETAILED DESCRIPTION OF THE INVENTION

Figure 1:
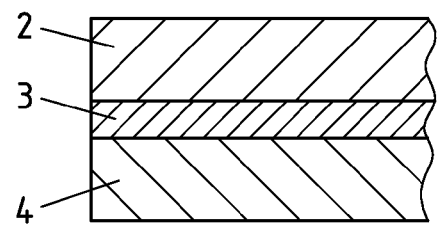
FIG. 1 provides, in a schematic section view, a first embodiment of an aluminium composite material, FIG. 2 provides, in a schematic section view, a brazed connection of a first embodiment of a brazed construction, FIG. 3 provides, in a schematic perspective representation, a further embodiment of a brazed construction in the form of a heat exchanger, FIG. 4 provides a further embodiment of a brazed construction in the form of a folded tube in a schematic section view, and FIGS. 5a-b provide two further embodiments of the composite material in a perspective, schematic representation.

First, FIG. 1 presents a first embodiment of an aluminium composite material according to the invention comprising three layers consisting of at least two different aluminium alloys. The aluminium composite material 1 has an upper covering layer 2, an internal aluminium brazing layer 3 and a lower covering layer 4, whereby the covering layers 2, 4 of the aluminium brazing layer have a thickness which exceeds the thickness of the aluminium brazing layer by at least a factor of 2. In the present case, for example, the brazing layer has a thickness of 50 µm and the two covering layers 2, 4 each have a thickness of 475 µm, so that the aluminium composite material has a total thickness of 1.0 mm. The covering layers thereby have a thickness which is 9.5 times larger than that of the aluminium brazing layer. It is conceivable that the aluminium composite material 1 has, in addition to the covering layers 2, 4 and the aluminium brazing layer 3, further layers in order, for example, to provide additional functions, for example, the provision of a sacrificial anode layer.

In the present embodiment, each of the covering layers individually has 47.5% of the total thickness. As a minimum, however, the thickness percentage of the covering layers in relation to the total thickness of the aluminium composite material is 15%. This may for example be the case if further layers, so for example a sacrificial anode layer, are added. In addition, other anti-corrosion layers, for example, consisting of an aluminium alloy of type AA1xxx can be provided. It is also conceivable that further brazing layers are provided on the outside.

Figure 2:
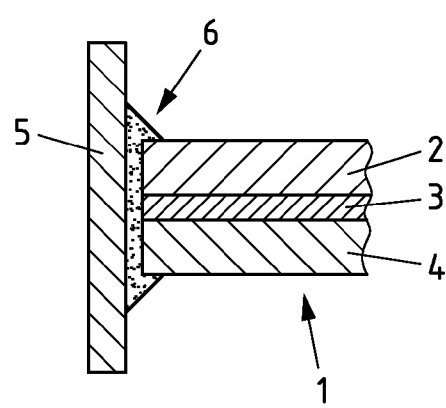

FIG. 2 depicts, in a schematic section view, a first embodiment of a brazed construction, whereby the brazed construction has an aluminium composite material with, in each case, two covering layers 2, 4 and an internal aluminium brazing layer 3, which is connected in an I-shaped butt joint with a further component 5 by means of a brazed connection. The aluminium composite material 1 may, for example, covering layers made from aluminium alloys of type AA1xxx, AA3xxx, AA5xxx, AA6xxx or AA7xxx. For heat exchangers, preferably aluminium alloy types AA3003 or AA3005 are advantageous as covering layers, because these have the necessary strength after brazing and are in addition reasonably priced. As FIG. 2 impressively shows, the internal aluminium brazing layer 3 makes it possible during the brazing process for the aluminium brazing material that becomes liquid to escape from the inside of the composite material and produces a brazed connection 6 between the aluminium composite material 1 and the component S. This is, in particular, due to the fact that the aluminium brazing layer, which preferably has a Si content of 6 wt.-%-13 wt.-%, has a liquidus temperature that is lower than the solidus temperature of the covering layers 2, 4, so that only the aluminium layer 3 liquefies at the brazing temperatures. Owing to the fact that the internal aluminium brazing material has just sufficient quantities of aluminium brazing material for the provision of the brazed connection, a 'burning through' of the brazed components because of a surplus of Al—Si brazing material was not observed in the brazing trials. The total thicknesses of the aluminium composite material are preferably 0.5 mm-4 mm, wherein, preferably, a minimum thickness of 50 µm of the aluminium brazing layer is used in order to guarantee a process reliability as high as possible when brazing in an I-shaped butt joint.

Figure 3:
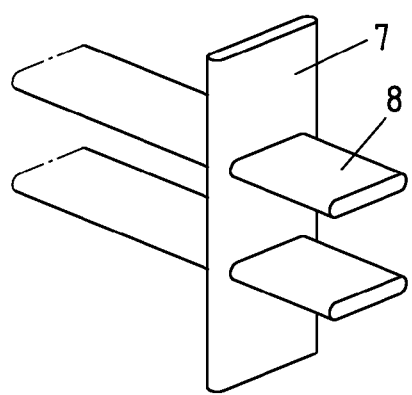

A typical brazed construction which has a brazed connection between the aluminium composite material according to the invention and a further component is shown in FIG. 3 in a perspective, schematic representation. FIG. 3 shows a main distributor 7, what is known as a 'header' of a heat exchanger, which keeps several flat aluminium tubes 8 in position, whereby the flat aluminium tubes 8 are carrying liquid. The lamellae of the heat exchanger are not depicted in FIG. 3.

Figure 4:
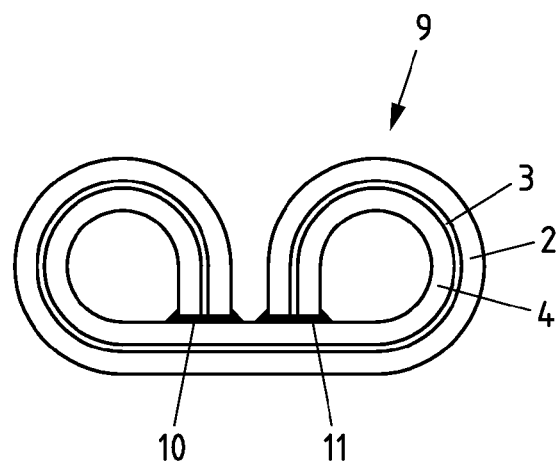

FIG. 4 shows a schematic section view of a further embodiment in the form of a folded tube 9, which consists of an aluminium composite material according to the invention with two covering layers 2, 4 and an internal aluminium brazing layer 3. The two I-shaped butt-joint brazing connections 10, 11, can be clearly discerned. The total wall thickness of the aluminium composite material of the folded tubes can be between 0.2 mm and 1.2 mm and/or 1.5 mm.

An aluminium composite material roll clad to different thicknesses consisting of two covering layers of an aluminium alloy of type AA3017 with the following composition: Si max. 0.25 wt.-% w/w, 0.25 wt.-% Fe 0.45 wt.-%, 0.3 wt.-% Cu 0.6 wt.-%, 0.9 wt.-% Mn 1.5 wt.-%, Mg max. 0.05 wt.-%, Cr max. 0.15 wt.-%, Zn max. 0.10 wt.-% Ti max. 0.25 wt.-% remainder Al and contaminants individually max. 0.05 wt.-% in total max. 0.15 wt.-%. The internal aluminium brazing layer of type AA4045, which has a percentage of 5% of the total thickness of the aluminium composite material was reshaped into a main distributor 7 and/or equipped with recesses for the flat aluminium tubes 8. The main distributor 7 rolled down to different thicknesses underwent, together with the flat aluminium tubes 8 present in the recesses, a CAB brazing process, wherein, in a first variant, no flux at all was used, in a second variant the flat aluminium tubes 8 were coated with a Si—Zn-based flux, in a third variant the aluminium tubes 8 were uncoated and the flux applied by hand and in a last variant flat aluminium tubes 8 equipped with a Si—Zn-based flux coating were used and additionally the brazed connections were coated with flux. The brazing results are shown in Table 1.

TABLE 1

| Total thickness | 1.0 mm | 1.5 mm | 2.0 mm | 2.5 mm | 3.0 mm |
| --- | --- | --- | --- | --- | --- |
| Thickness of covering layers | 475 μm | 712.5 μm | 950 μm | 1187.5 mm | 1425 μm |
| Brazing material thickness | 50 μm | 75 μm | 100 μm | 125 μm | 150 μm |
| Aluminium tubes, coated (Si + Zn-Flux) | Good | Good | Good | Good | Good |
| Aluminium tubes, shiny + application of flux | In some cases | Good | Good | Good | Good |
| Aluminium tubes, coated (Si + Zn-Flux) + application of flux | Good | Good | Good | Good | Good |

It can be recognised that, without fluxes, only a partial brazed connection was possible and that even with a layer thickness of 50 μm of the aluminium brazing layer and a composite material thickness of a total of 1 mm, a flawless brazed connection could only be provided in the case of coated flat aluminium tubes 8. Without flux, no flawless brazed connections were achieved, regardless of the thickness of the aluminium brazing layer. With increasing aluminium brazing layer thickness, already from a thickness of 75 μm and upwards of the aluminium brazing layer with a composite material thickness of 1.5 mm, however, even a shiny flat aluminium tube with manually applied flux in the area of the brazed connections showed a good brazing result. It is assumed that the results obtained in the CAB brazing process are also transferrable to a vacuum brazing process without flux, wherein with the vacuum brazing process a good brazing result is anticipated for aluminium brazing layer thicknesses of 50 μm and upwards.

Figure 5A:
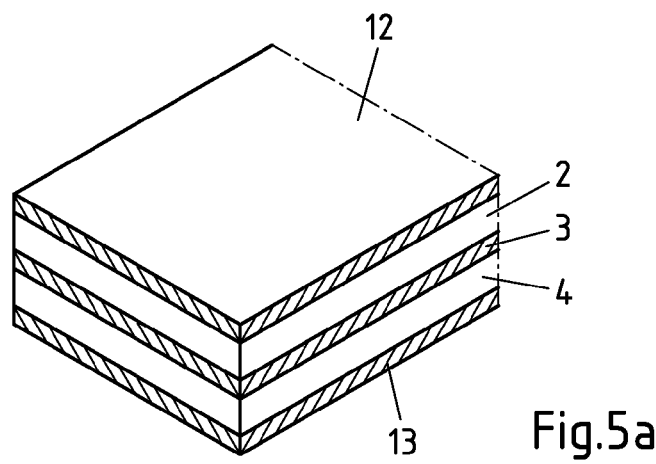
Figure 5B:
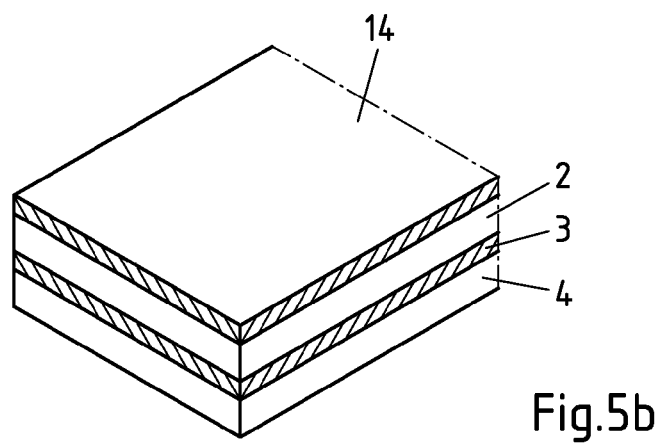

Finally, FIGS. 5a) and 5b) depict two further embodiments of the aluminium composite material according to the invention, whereby the three-layered aluminium composite material made from covering layers 2, 4 and brazing layer 3 is expanded by additional layers 12 and 13, FIG. 5a and/or an additional layer 14, FIG. 5b). The additional layers 12, 13 can have different functions. It is advantageous, for example, if the outer layers 12, 13 are designed as additional brazing layers in order to be able to provide brazed connections not only on the face side of the composite material. But also a combination of anti-corrosion layer and brazing layer and two anti-corrosion layers and one of the combinations with a sacrificial anode layer can be achieved by means of the additional layers 12, 13. The same applies also to an additional layer 14, it can be configured as a brazing material, anti-corrosion or sacrificial anode layer. It is also conceivable that, for example, the layer 12 in FIG. 5a) or the layer 14, FIG. 5b) already consist of two layers, so that further adaptations of the three-layered aluminium composite material are made possible by means of the provision of additional layers on the particular application.

The invention claimed is:

1. Three-layered brazable aluminium composite material suitable for I-shaped butt-joint brazed connections consisting of at least two different aluminium alloys, whereby an inner layer of the three layers is an aluminium brazing layer made from an aluminium brazing alloy, the other layers being configured as covering layers and consist of at least one further aluminium alloy, whereby the at least one further aluminium alloy has a higher solidus temperature than the liquidus temperature of the aluminium brazing alloy, wherein the individual covering layers have a thickness that exceeds the thickness of the aluminium brazing layer by at least a factor of 1.5.

2. The aluminium composite material according to claim 1, wherein the individual covering layers have a thickness that exceeds the thickness of the aluminium brazing layer by at least a factor of 2.

3. The aluminium composite material according to claim 1, wherein the thicknesses of the individual covering layers are not identical.

4. The aluminium composite material according to claim 1, wherein the aluminium composite material has as an outer surface of a rolled aluminium surface.

5. The aluminium composite material according to claim 1, wherein the covering layers contribute to the mechanical strength of the aluminium composite material.

6. The aluminium composite material according to claim 1, wherein the total thickness of the aluminium composite material is 0.2 to 5 mm.

7. The aluminium composite material according to claim 1, wherein the covering layers consist of aluminium alloys that have a Mg content of less than 0.1 wt.-%.

8. A brazed construction comprising at least a first component, which consists at least in part of an aluminium composite material according to claim 1, which is connected to at least a second component by means of a brazed connection.

9. The brazed construction according to claim 8, wherein the construction has at least one brazed connection in the form of an I-shaped butt-joint.

10. The brazed construction according to claim 8, wherein the brazed construction is part of a heat exchanger.

11. The brazed construction according to claim 8, wherein the brazed construction is a main distributor of a heat exchanger or a folded tube.

12. A method for producing an I-shaped butt-joint brazed connection comprising utilization of at least a first component consisting at least in part of an aluminium composite material according to claim 1, wherein at least the first component is connected to at least a second component.

13. A method according to claim 12, wherein a CAB brazing technique or a vacuum brazing is utilized.

14. A method according to claim 13, wherein a CAB brazing technique employing Si—Zn-based flux is utilized.

15. A method for producing an aluminium composite material according to claim 1, comprising roll cladding or simultaneous casting.

* * * * *